US012424763B2

(12) United States Patent
Kim et al.

(10) Patent No.: US 12,424,763 B2
(45) Date of Patent: Sep. 23, 2025

(54) STEALTH ANTENNA HAVING ELECTROMAGNETIC WAVE ABSORBER WITH SANDWICH STRUCTURE

(71) Applicant: Korea Advanced Institute of Science and Technology, Daejeon (KR)

(72) Inventors: Chun-Gon Kim, Daejeon (KR); Woo-Hyeok Jang, Daejeon (KR); Min-Su Jang, Daejeon (KR); Do-Hyeon Jin, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 318 days.

(21) Appl. No.: 17/931,966

(22) Filed: Sep. 14, 2022

(65) Prior Publication Data

US 2023/0084229 A1 Mar. 16, 2023

(30) Foreign Application Priority Data

Sep. 14, 2021 (KR) ........................ 10-2021-0122684

(51) Int. Cl.
*H01Q 17/00* (2006.01)
*H01Q 1/28* (2006.01)
(Continued)

(52) U.S. Cl.
CPC ............. *H01Q 17/00* (2013.01); *H01Q 1/286* (2013.01); *H01Q 1/38* (2013.01); *H01Q 9/0407* (2013.01); *H01Q 17/005* (2013.01); *H01Q 1/40* (2013.01)

(58) Field of Classification Search
CPC ...... H01Q 17/00; H01Q 9/0407; H01Q 1/286; H01Q 17/005; H01Q 21/08; H01Q 1/405;
(Continued)

(56) References Cited

U.S. PATENT DOCUMENTS

2016/0099498 A1* 4/2016 Pance .................... H05K 1/024 428/458
2019/0326656 A1* 10/2019 Sotzing .................... H01Q 1/38

FOREIGN PATENT DOCUMENTS

KR 20150139050 A * 12/2015 ............. B32B 27/06

OTHER PUBLICATIONS

Jayalakshmi, C. G., Inamdar, A., Anand, A., & Kandasubramanian, B. (2019). Polymer matrix composites as broadband radar absorbing structures for stealth aircrafts. Journal of Applied Polymer Science, 136(14). https://doi.org/10.1002/app.47241 (Year: 2019).*

(Continued)

*Primary Examiner* — Vladimir Magloire
*Assistant Examiner* — Remash R Guyah
(74) *Attorney, Agent, or Firm* — DALY, CROWLEY, MOFFORD & DURKEE, LLP

(57) ABSTRACT

A stealth antenna includes an electromagnetic wave absorbing structure and an antenna patch embedded in the electromagnetic wave absorbing structure. The electromagnetic wave absorbing structure includes an upper dielectric layer, a lower dielectric layer and a spacer disposed between the upper dielectric layer and the lower dielectric layer. The upper dielectric layer includes a dielectric fabric and a conductive coating layer combined with at least a portion of the dielectric fabric. The lower dielectric layer includes a dielectric fabric and has a dielectric constant lower than that of the upper dielectric layer. The antenna patch is disposed between the spacer and the lower dielectric layer.

6 Claims, 7 Drawing Sheets

(51) Int. Cl.
*H01Q 1/38* (2006.01)
*H01Q 9/04* (2006.01)
*H01Q 1/40* (2006.01)

(58) Field of Classification Search
CPC .......... H01Q 1/38; H01Q 1/52; H01Q 9/0421; H01Q 1/40–44; H01Q 1/521–526; H01Q 17/002–008; H01Q 1/42; H01Q 15/0006–0093; H01Q 1/2283; H05K 9/0073
USPC ................. 343/700 MS, 846, 909, 872, 873; 428/323, 328, 331, 304.4; 342/1–4, 175
See application file for complete search history.

(56) References Cited

OTHER PUBLICATIONS

Gao, Z., Fan, Q., Xu, C., Tian, X., Tian, C., Wang, J., & Qu, S. (2021). Compatible stealth design of infrared and radar based on plasmonic absorption structure. Optics Express, 29(18), 28767â28777. https://doi.org/10.1364/OE.432703 (Year: 2021).*

Kapoor, Ankush, Ranjan Mishra, and Pradeep Kumar. âFrequency Selective Surfaces as Spatial Filters: Fundamentals, Analysis and Applications.â Alexandria engineering journal 61.6 (2022): 4263â4293. Web. (Year: 2021).*

* cited by examiner

STEALTH ANTENNA HAVING ELECTROMAGNETIC WAVE ABSORBER WITH SANDWICH STRUCTURE

CROSS-REFERENCE TO RELATED APPLICATION

This application claims priority under 35 USC § 119 to Korean Patent Application No. 10-2021-0122684 filed on Sep. 14, 2021 in the Korean Intellectual Property Office (KIPO), the disclosure of which is incorporated by reference herein in its entirety.

BACKGROUND

1. Field

Embodiments of the inventive concept relate to an antenna. More particularly, embodiments of the inventive concept relate to a stealth antenna having an electromagnetic-wave absorber with a sandwich structure.

2. Description of the Related Art

A stealth technology is a technology for reducing or controlling signals used for detection, such as an infrared signal, an acoustic signal, an electromagnetic wave signal, a visible ray signal, so that a structure may not be easily detected. Detection using an electromagnetic-wave signal may provide a kind of a target as well as a location, a speed and a size of the target. Thus, a lot of researches and developments are being conducted for an electromagnetic stealth technology against detection using an electromagnetic wave.

The most important aspect of an electromagnetic stealth technology is to reduce a radar cross section (RCS). The radar cross section is a size of the target, which is recognized by a radar. When an electromagnetic stealth technology is applied to the target, the radar may recognize the size of the target as noise such as birds or insects so that the target may avoid detection.

Methods for reducing the radar cross section may include shape-design, electromagnetic wave absorption, and electromagnetic wave cancellation. The shape-design is basically used to realize the stealth performance. The shape-design reduces the radar cross section by forming an angled shape to control the reflection direction of electromagnetic waves, or by forming a curved shape to scatter electromagnetic waves. According to the shape-design technology, electromagnetic waves do not disappear but are reflected in different directions or scattered. Thus, the shape-design technology needs to be combined with other stealth technologies to compensate for improving performance. The electromagnetic wave cancellation reduces electromagnetic waves by using electromagnetic waves having an opposite phase. However, the electromagnetic wave cancellation has little effect on oblique incidence. Electromagnetic absorption reduces reflected electromagnetic waves by applying a material capable of absorbing electromagnetic waves to a target.

Recently, to reduce weight, electromagnetic wave absorbing structures (RAS, Radar Absorbing Structures) using materials having both electromagnetic wave absorbing ability and structural performance are being actively studied with targeting aircrafts that require light weight.

The electromagnetic wave absorbing structure is designed and manufactured using a composite material such as fiber reinforced plastic to simultaneously perform two roles. The fiber-reinforced plastics include fibers for structural performance and matrix materials to retain shape thereof. In addition, in order to design an electromagnetic wave absorbing structure, electromagnetic properties (dielectric constant, permeability) or thickness of the materials are adjusted. For example, a high-conductive material may be added to a matrix material, or the fibers may be coated with a conductive material. In addition, foams or honeycomb cores may be used for light weight.

An antenna that transmits and receives electromagnetic waves contributes the most to increase of the radar cross section. A plurality of antennas are included in an aircraft for communication, detection, etc., and a metal material is generally exposed on a surface of the air craft to send and receive electromagnetic waves. Because a metal material has a high electromagnetic wave reflectance, the radar cross section of the metal material is larger than that of other materials. Various stealth antennas have been studied to reduce the radar cross section of an antenna, but conventional stealth antennas have a narrow usable frequency range and low performance compared to the electromagnetic wave absorbing structure.

SUMMARY

Embodiments provide a stealth antenna having a wide absorbing band.

According to an embodiment, a stealth antenna includes an electromagnetic wave absorbing structure and an antenna patch embedded in the electromagnetic wave absorbing structure. The electromagnetic wave absorbing structure includes an upper dielectric layer, a lower dielectric layer and a spacer disposed between the upper dielectric layer and the lower dielectric layer. The upper dielectric layer includes a dielectric fabric and a conductive coating layer combined with at least a portion of the dielectric fabric. The lower dielectric layer includes a dielectric fabric and has a dielectric constant lower than that of the upper dielectric layer. The antenna patch is disposed between the spacer and the lower dielectric layer.

In an embodiment, the conductive coating layer is combined with an entire portion of the dielectric fabric to overlap the antenna patch.

In an embodiment, the conductive coating layer does not overlap the antenna patch.

In an embodiment, the conductive coating layer includes at least one of nickel, cobalt and iron.

In an embodiment, the dielectric fabric of the upper dielectric layer or the dielectric fabric of the lower dielectric layer includes a glass fiber or an aramid fiber.

In an embodiment, the spacer includes a porous foam.

In an embodiment, the spacer includes a plurality of partition walls extending in a vertical direction.

In an embodiment, the antenna patch is embedded in the lower dielectric layer so that an upper surface of the antenna patch and an upper surface of the lower dielectric layer have a same height.

In an embodiment, an absorbing band of the electromagnetic wave absorbing structure includes at least one of C-band, X-band and Ku-band.

In an embodiment, an operating frequency of stealth antenna overlaps the absorbing band of the electromagnetic wave absorbing structure.

In an embodiment, an operating frequency of stealth antenna is different from the absorbing band of the electromagnetic wave absorbing structure.

According to the embodiments of the present inventive concept, an electromagnetic wave absorbing performance of a stealth antenna may be improved with minimizing loss of antenna performance.

It is to be understood that both the foregoing general description and the following detailed description are exemplary and explanatory and are intended to provide further explanation of the invention as claimed.

BRIEF DESCRIPTION OF THE DRAWINGS

The above and other features of the inventive concept will become more apparent by describing in detail embodiments thereof with reference to the accompanying drawings, in which.

DETAILED DESCRIPTION

Figure 1:
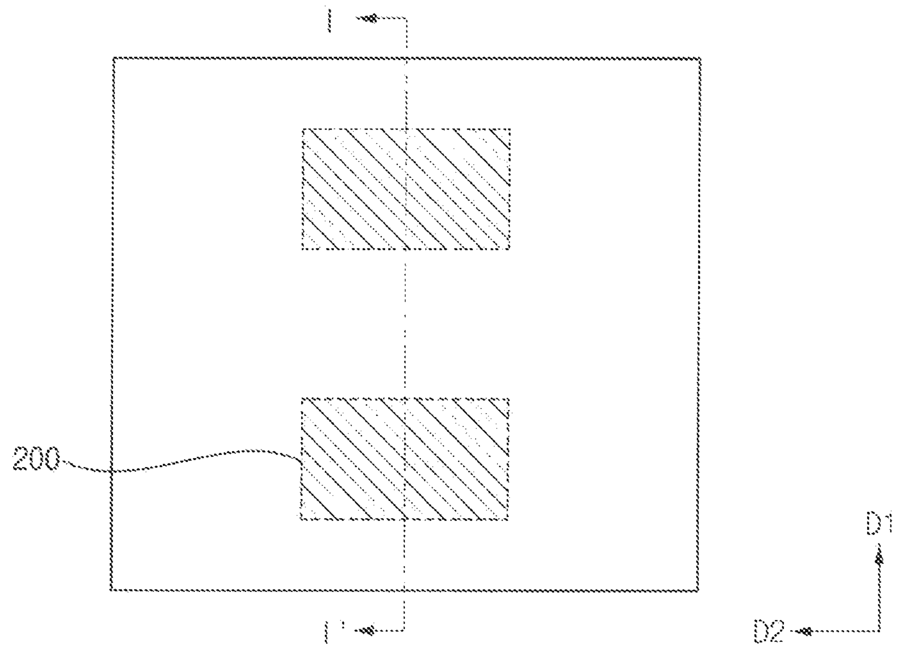
FIG. 1 is a plan view illustrating a stealth antenna according to an embodiment.

Embodiments are described more fully hereinafter with reference to the accompanying drawings. The inventive concept may, however, be embodied in many different forms and should not be construed as limited to the embodiments set forth herein. In the drawings, the sizes and relative sizes of layers and regions may be exaggerated for clarity. It will be understood that, although the terms first, second, third etc. may be used herein to describe various elements, components, regions, layers, patterns and/or sections, these elements, components, regions, layers, patterns and/or sections should not be limited by these terms. These terms are only used to distinguish one element, component, region, layer pattern or section from another region, layer, pattern or section. Thus, a first element, component, region, layer or section discussed below could be termed a second element, component, region, layer or section without departing from the teachings of embodiments.

Embodiments are described herein with reference to cross sectional illustrations that are schematic illustrations of illustratively idealized embodiments (and intermediate structures) of the inventive concept. As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the inventive concept.

The terminology used herein is for the purpose of describing particular embodiments only and is not intended to be limiting of the invention. As used herein, the singular forms “a,” “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
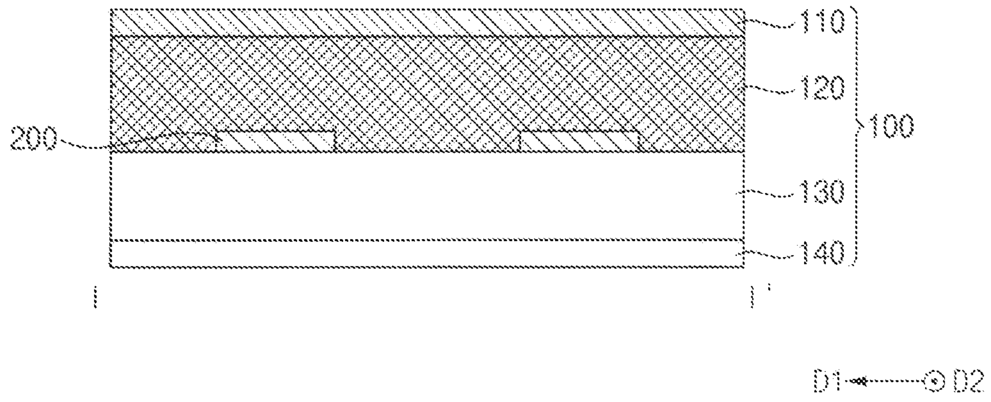
FIG. 2 is a cross-sectional view taken along line I-I' of FIG. 1.
Figure 3:
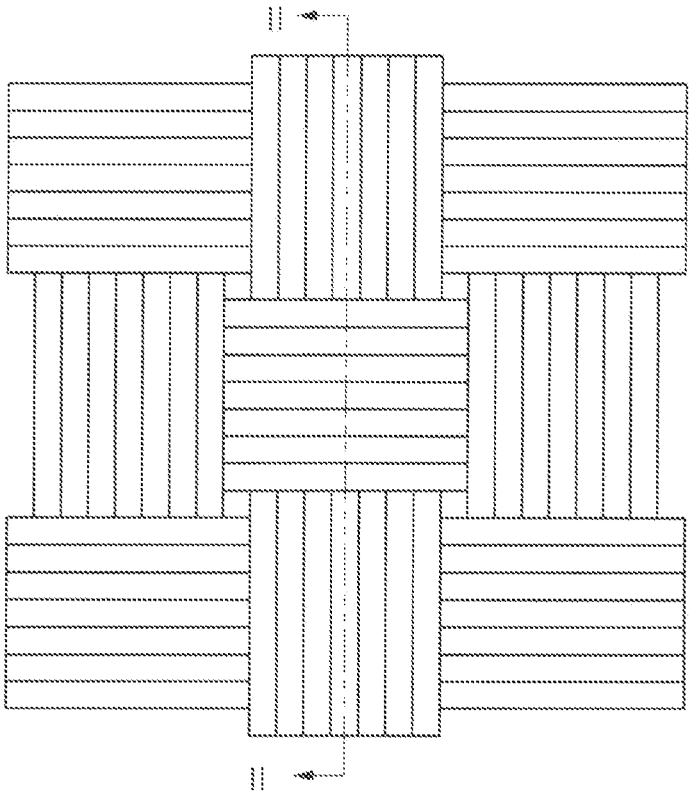
FIG. 3 is a plan view illustrating a dielectric fabric of an upper dielectric layer of a stealth antenna according to an embodiment.
Figure 4:
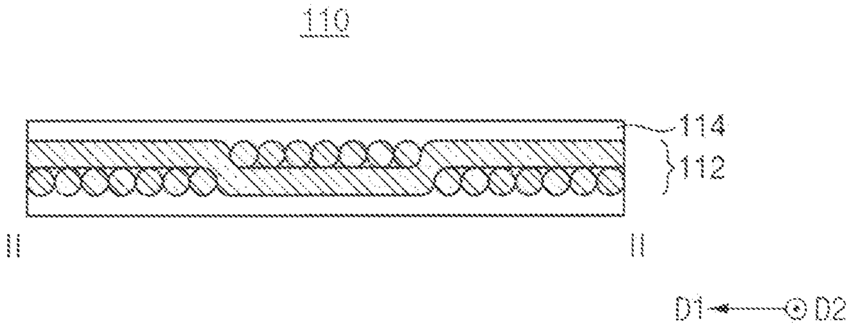
FIG. 4 is a cross-sectional view taken along line II-II' of FIG. 3.
Figure 5:
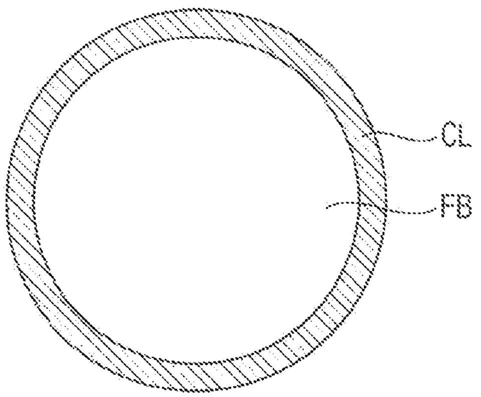
FIG. 5 is a cross-sectional view illustrating a metal-coated fiber of an upper dielectric layer of a stealth antenna according to an embodiment.
Figure 6:
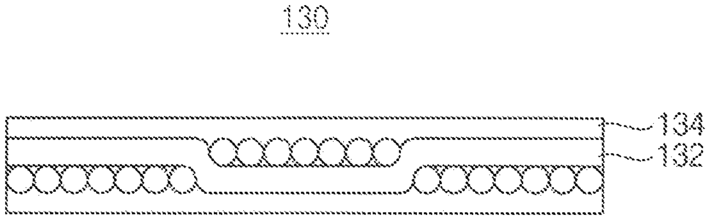
FIG. 6 is a cross-sectional view illustrating an lower dielectric layer of a stealth antenna according to an embodiment.

FIG. 1 is a plan view illustrating a stealth antenna according to an embodiment. FIG. 2 is a cross-sectional view taken along line I-I' of FIG. 1. FIG. 3 is a plan view illustrating a dielectric fabric of an upper dielectric layer of a stealth antenna according to an embodiment. FIG. 4 is a cross-sectional view taken along line II-II' of FIG. 3. FIG. 5 is a cross-sectional view illustrating a metal-coated fiber of an upper dielectric layer of a stealth antenna according to an embodiment. FIG. 6 is a cross-sectional view illustrating a lower dielectric layer of a stealth antenna according to an embodiment.

Referring to FIGS. 1 and 2, a stealth antenna 10 according to an embodiment includes an electromagnetic wave absorbing structure 100 and an antenna patch 200 embedded in the electromagnetic wave absorbing structure 100.

In an embodiment, the electromagnetic wave absorbing structure 100 includes an upper dielectric layer 110, a spacer 120, a lower dielectric layer 130 and a conductive layer 140. The conductive layer may be configured to function as a perfect conductor. The spacer 120 and the lower dielectric layer 130 are disposed between the upper dielectric layer 110 and the conductive layer 140. The spacer 120 is disposed between the upper dielectric layer 110 and the lower dielectric layer 130. In an embodiment, the antenna patch 200 may be disposed between the spacer 120 and the lower dielectric layer 130.

The upper dielectric layer 110 may include a conductive material to adjust electromagnetic properties (dielectric constant, etc.) of the electromagnetic wave absorbing structure 100. For example, the upper dielectric layer 110 may include a dielectric fabric having a conductive coating layer. For example, the dielectric fabric may consist of fibers coated with a conductive material.

Referring to FIGS. 3 and 4, a dielectric fabric 112 may include first fibers arranged along a first direction D1 and second fibers arranged along a second direction D2 perpendicular to the first direction D1. In an embodiment, a first bundle including the first fibers and a second bundle including the second fibers may be used for a warp and a weft for crafting thereby forming the dielectric fabric 112.

For example, the first fiber and the second fiber may each include a glass fiber, an aramid (Kevlar) fiber or the like. The first fiber and the second fiber may include a same material or different materials. As desired, fibers in a same bundle include different materials from each other.

The dielectric fabric 112 may have a conductive coating layer. For example, the conductive coating layer may be formed by coating a conductive material on the dielectric fabric 112 through electroless plating, sputtering, chemical vapor deposition, vacuum vapor deposition, thermal vapor deposition or the like. For example, each fiber in the dielectric fiber 112 may have a cross-sectional shape in which a conductive coating layer CL surrounds a base fiber FB, as illustrated in FIG. 5.

In an embodiment, the conductive layer CL may include a ferroelectric material such as iron (Fe), cobalt (Co), nickel (Ni) or the like. However, embodiments are not limited thereto. For example, a conductive carbon fiber such as carbon black, carbon nano-tube, graphene or the like may be used for the conductive layer CL or may be combined with the ferroelectric material.

Referring to FIG. 4, the upper dielectric layer 110 includes a resin layer 114 combined with the dielectric fabric 112. The dielectric fabric 112 may be impregrated with the resin layer 114. For example, the resin layer 114 may include an epoxy resin, a phenolic resin, a polyimide resin, an acrylic resin, a polyester resin or the like.

For example, a sheet resistance of the upper dielectric layer 110 may be 350 ohm/sq to 400 ohm/sq. However, embodiments are not limited thereto, and the upper dielectric layer 110 may have various configurations and sheet resistances.

Referring to FIG. 6, the lower dielectric layer 130 may include a dielectric fabric 132. The dielectric fabric 132 may be impregnated with a resin layer 134. The dielectric fabric 132 and the resin layer 134 of the lower dielectric layer 130 may have substantially same configurations as the dielectric fabric 112 and the resin layer 114 of the upper dielectric layer 110 except that the dielectric fabric 132 does not have a metal coating layer. Thus, the lower dielectric layer 130 may have a dielectric constant lower than that of the upper dielectric layer 110. As desired, a plurality of fabric-resin composite sheets may be stacked such that the upper dielectric layers 110 and the lower dielectric layers 130 have a proper thickness.

A size and a shape of the antenna patch 200 may be designed depending on an operating frequency band of the stealth antenna. The antenna patch 200 may include various conductive materials such as a metal, a conductive metal oxide, a conductive carbon material, a conductive composite or the like.

In an embodiment, the spacer 120 may have a porous structure. For example, the spacer 120 may include a foam formed of an acrylic resin, an urethane resin, a polyimide resin or the like. For example, the spacer 120 may be formed of Rohacell™, which is from Degussa and includes polymethacrylimide (PMI).

The spacer 120 having a porous structure may reduce weight of the stealth antenna and may improve impact resistance thereof. Furthermore, a thickness of the spacer 120 may be increased so that the stealth antenna may be designed to have absorbing performance in a wide band.

The conductive layer 140 includes a conductive material to function as a perfect conductor. For example, the conductive layer 140 may include a metal, a conductive oxide, a carbon-based conductive material or the like. In an embodiment, the conductive layer 140 may include a metal thin film, a metal foil or the like. The metal may include copper, gold, silver, aluminum, nickel, titanium, molybdenum or the like.

A thickness of the electromagnetic wave absorbing structure 100 according to an embodiment may be adjusted depending on a target wavelength and a target reflectivity. For example, when the target wavelength is increased, the thickness of the electromagnetic wave absorbing structure 100 is supposed to be increased. The reflectivity Γ of the electromagnetic wave absorbing structure 100 may be determined by impedance $Z_0$ of the air and input impedance $Z_{in}$ of the electromagnetic wave absorbing structure 100 as the following formula. For example, the electromagnetic wave absorbing structure 100 may be designed in view of dielectric constants and thicknesses of materials so that the input impedance $Z_{in}$ may be approximate to the impedance $Z_0$ of the air.

$$r = \frac{Z_{in} - Z_0}{Z_{in} + Z_0}$$

In a stealth antenna according to an embodiment, an absorbing band of the electromagnetic wave absorbing structure may be different from an operating frequency of the antenna (Out-of-band configuration). Thus, the operating frequency of the antenna may be out of the absorbing band of the electromagnetic wave absorbing structure. Such configuration may prevent gain loss of the antenna. For example, the operating frequency of the antenna is about 3 GHz, and the absorbing band of the electromagnetic wave absorbing structure may be C-band (4.6 GHz~9.7 GHz). However, embodiments are not limited thereto. For example, the absorbing band of the electromagnetic wave absorbing structure may be designed by adjusting a thickness thereof to be X-band or Ku-band. The operating frequency of the antenna may be changed by adjusting a size of the antenna patch.

In a stealth antenna according to another embodiment, the absorbing band of the electromagnetic wave absorbing structure may overlap the operating frequency of the antenna (In-band configuration). Thus, the operating frequency of the antenna may be within the absorbing band of the electromagnetic wave absorbing structure. In such configuration, a conductive coating layer of a dielectric fabric in an upper dielectric layer may be partially removed to prevent gain loss.

Figure 7:
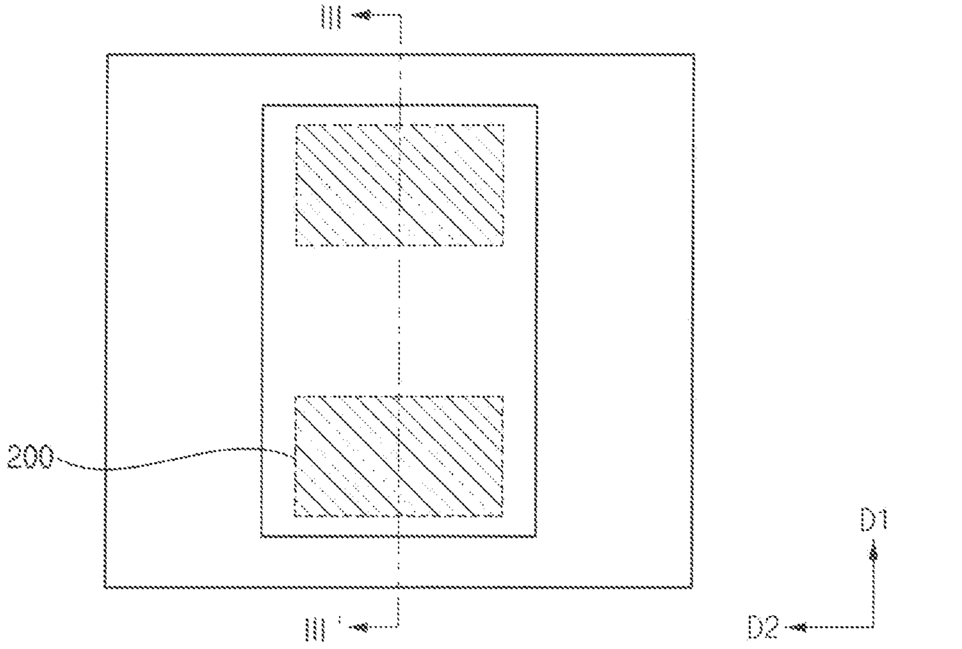
FIG. 7 is a plan view illustrating a stealth antenna according to an embodiment.
Figure 8:
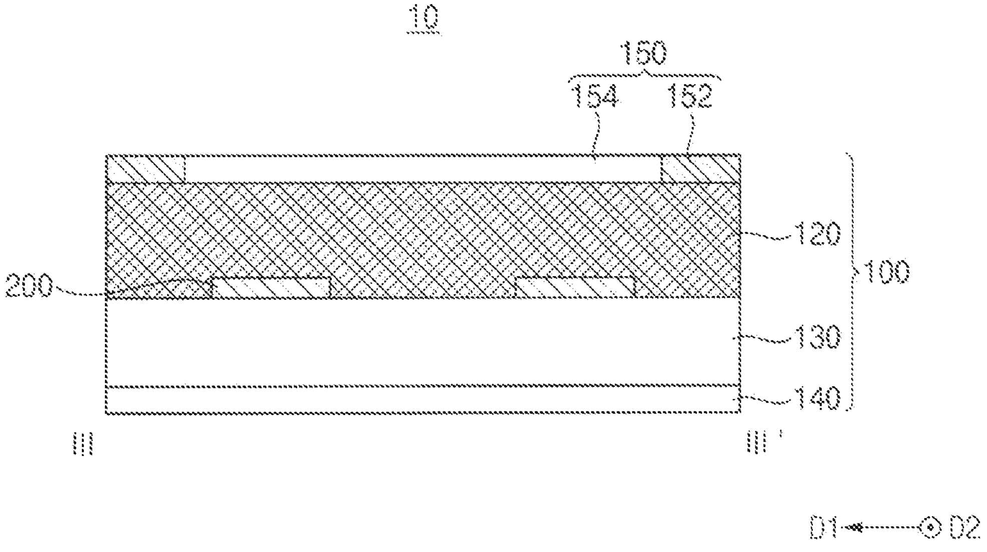
FIG. 8 is a cross-sectional view taken along line III-III' of FIG. 7.

FIG. 7 is a plan view illustrating a stealth antenna according to an embodiment. FIG. 8 is a cross-sectional view taken along line III-III' of FIG. 7.

A stealth antenna 10 according to an embodiment includes an electromagnetic wave absorbing structure 100 and an antenna patch 200 embedded in the electromagnetic wave absorbing structure 100.

In an embodiment, the electromagnetic wave absorbing structure 100 includes an upper dielectric layer 150, a spacer 120, a lower dielectric layer 130 and a conductive layer 140. The conductive layer may be configured to function as a perfect conductor. The spacer 120 and the lower dielectric layer 130 are disposer between the upper dielectric layer 150 and the conductive layer 140. The spacer 120 is disposed between the upper dielectric layer 150 and the lower dielectric layer 130. In an embodiment, the antenna patch 200 may be disposed between the spacer 120 and the lower dielectric layer 130.

In an embodiment, the upper dielectric layer 150 may include a dielectric fabric partially combined with a conductive coating layer. For example, the upper dielectric layer 110 may have a first area 152 including a conductive coating layer and a second area 154 not including a conductive layer. The second area 154 may overlap the antenna patch 200.

For example, a conductive coating layer may be selectively formed at the first area 152 of the dielectric fabric. In another embodiment, after a conductive coating layer is formed entirely on the dielectric fabric, the conductive coating layer may be removed from the second area 154 thereby forming the upper dielectric layer 150 partially having the conductive coating layer.

In an embodiment, as the conductive coating layer is removed from a portion of the dielectric layer 150, which overlaps the antenna patch 200, gain loss of the antenna may be prevented.

Furthermore, when the antenna patch 200 is disposed between the spacer 120 and the lower dielectric layer 130, gain of the antenna may be increased with compared to a configuration in which an antenna patch is disposed on an upper dielectric layer. Thus, even in In-band configuration in which an absorbing band of an electromagnetic wave absorbing structure overlaps an operating frequency of an antenna, high stealth performance and high antenna performance may be maintained.

Figure 9:
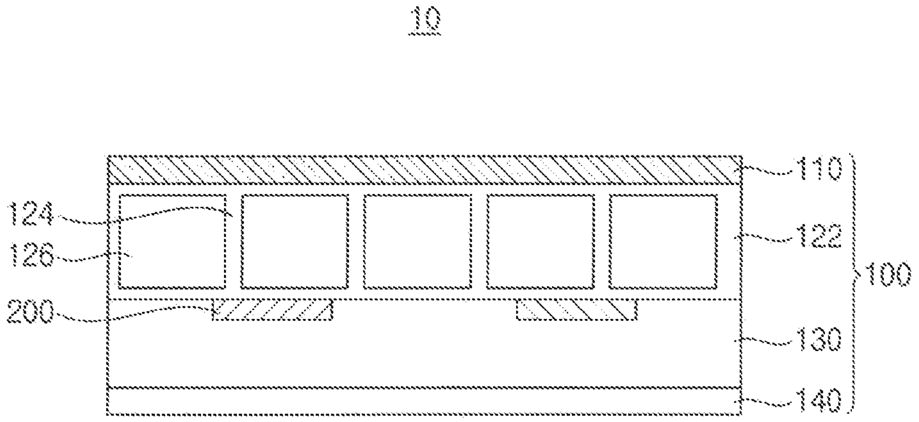
FIG. 9 is a cross-sectional view illustrating a stealth antenna according to an embodiment.

FIG. 9 is a cross-sectional view illustrating a stealth antenna according to an embodiment.

Referring to FIG. 9, a stealth antenna 10 according to an embodiment includes an electromagnetic wave absorbing structure 100 and an antenna patch 200 embedded in the electromagnetic wave absorbing structure 100.

In an embodiment, the electromagnetic wave absorbing structure 100 includes an upper dielectric layer 110, a spacer 122, a lower dielectric layer 130 and a conductive layer 140. The conductive layer may be configured to function as a perfect conductor. The spacer 122 and the lower dielectric layer 130 are disposed between the upper dielectric layer 110 and the conductive layer 140.

In an embodiment, the spacer 122 may include partition walls 124 extending in a vertical direction. For example, the spacer 122 may have a honeycomb shape in a plan view. An empty space may be defined between the partition walls 124.

The antenna patch 200 may be embedded in the lower dielectric layer 130 so that the spacer 122 may be easily combined with the lower dielectric layer 130. Thus, an upper surface of the antenna patch 200 may have a substantially same height as an upper surface of the lower dielectric layer 130 thereby forming an entirely flat upper surface. For example, a resin sheet and the antenna patch 200 are disposed on a dielectric fabric, and then pressed thereby forming the lower dielectric layer 130 combined with the antenna patch 200 embedded therein.

In an embodiment, the spacer 122 including the partition walls may include a glass fiber reinforced plastic (GFRP). Since the spacer 122 including GFRP has high physical properties, structural performance of the stealth antenna may be improved. However, embodiments are not limited thereto. The spacer 122 may include various materials, which are known as dielectric materials that may be shaped.

As explained in the above, stealth antennas according to embodiments may improve performance thereof by adjusting a spacer.

Hereinafter, performance of embodiments of the present inventive concept will be described with reference to simulations.

EXAMPLE

A sandwich-typed electromagnetic wave absorbing structure was designed using transmission line theory to target on an entire range of C-band and a partial range of X-band, which are target frequencies of conventional stealth technologies for aircrafts. An antenna patch with a thickness of 1.6 mm was designed for target on 3 GHz of operating frequency, which is for commercial communication.

Thus obtained thickness of the electromagnetic wave absorbing structure except for a perfect conductive layer was about 7.5 mm, and when an area of a unit cell including electromagnetic wave absorbing structure was 100 mm×100 mm, a size of the antenna patch was about 22 mm×30 mm.

Figure 10:
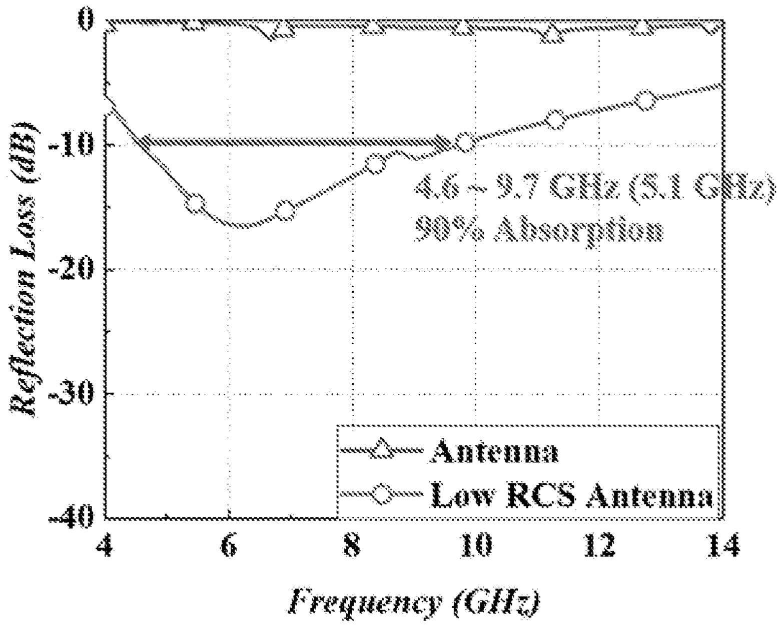
FIG. 10 is a graph illustrating reflection loss of the example (Low RCS Antenna) and the comparative example (Antenna).
Figure 11:
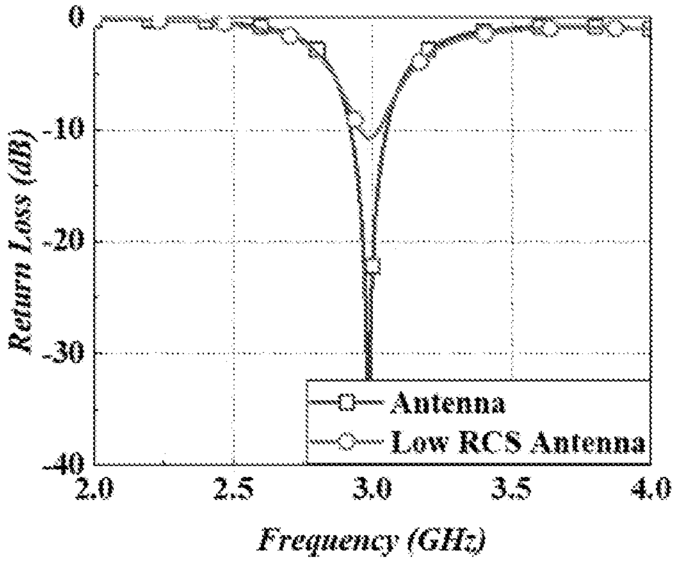
FIG. 11 is a graph illustrating return loss of the example (Low RCS Antenna) and the comparative example (Antenna).
Figure 12:
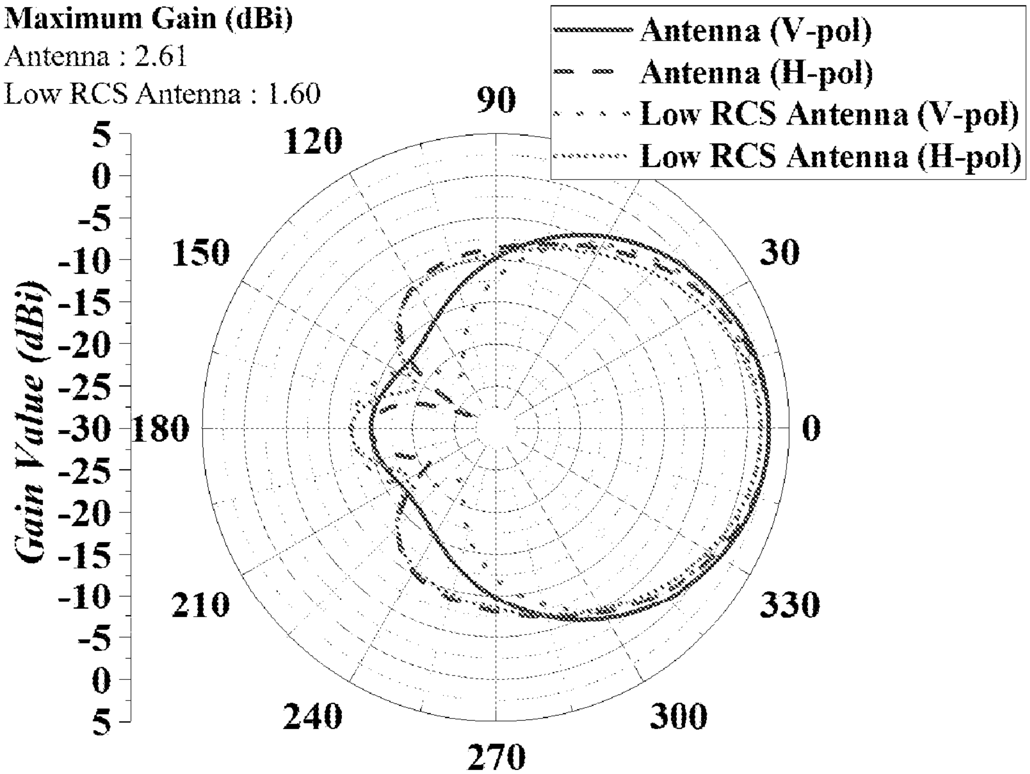
FIG. 12 is a graph illustrating gain (Gain) of the example (Low RCS Antenna) and the comparative example (Antenna).

A simulation was performed to evaluate performance of the above-obtained stealth antenna. As a comparative example, an antenna patch having a same size without an electromagnetic wave absorbing structure was used. FIG. 10 is a graph illustrating reflection loss of the example (Low RCS Antenna) and the comparative example (Antenna). FIG. 11 is a graph illustrating return loss of the example (Low RCS Antenna) and the comparative example (Antenna). FIG. 12 is a graph illustrating gain (Gain) of the example (Low RCS Antenna) and the comparative example (Antenna).

Referring to FIGS. 10 to 12, the stealth antenna of the example had a gain value reduced with compared to the comparative example, however, the gain value was maintained in a usable range. Furthermore, the stealth antenna of the example absorbed electromagnetic waves by at most about 98%, and a band width absorbed by about 90% or more was about 5.1 GHz. Thus, it can be noted that the stealth antenna of the example has absorbing performance approximate to an electromagnetic wave absorbing structure and may achieve a high stealth performance.

Stealth antennas according to embodiments may be used for various industry requiring a stealth technology such as aircrafts, vessels, spaceships or the like.

The foregoing is illustrative and is not to be construed as limiting thereof. Although a few embodiments have been described, those skilled in the art will readily appreciate that many modifications are possible in the embodiments without materially departing from the novel teachings, aspects, and advantages of the invention. Accordingly, all such modifications are intended to be included within the scope of this disclosure.

What is claimed is:

1. A stealth antenna comprising:

an electromagnetic wave absorbing structure having a sandwich structure including an upper dielectric layer, a spacer and a lower dielectric layer so that the electromagnetic wave absorbing structure has an absorbing band determined by a dielectric constant and a thickness thereof, the absorbing band being a frequency range of electromagnetic waves that the electromagnetic wave absorbing structure is able to absorb; and an antenna patch embedded in the electromagnetic wave absorbing structure and disposed between the spacer and the lower dielectric layer, wherein the upper dielectric layer includes a dielectric fabric and a conductive coating layer coated on a portion of the dielectric fabric so that the upper dielectric layer has a first area where the conductive coating layer is disposed, and a second area where the conductive coating layer is not disposed, the second area overlapping the antenna patch in a plan view such that the conductive coating layer is absent from an area above the antenna patch, the dielectric fabric including first fibers arranged along a first direction and second fibers arranged along a second direction perpendicular to the first direction, wherein the lower dielectric layer includes a dielectric fabric impregnated with a resin and having a dielectric constant lower than that of the upper dielectric layer, wherein the spacer is disposed and entirely continuous between the upper dielectric layer and the lower dielectric layer, the spacer including a porous foam formed of a resin, wherein an operating frequency of the stealth antenna overlaps the absorbing band of the electromagnetic wave absorbing structure, wherein a sheet resistance of the upper dielectric layer is 350 ohm/sq to 400 ohm/sq.

2. The stealth antenna according to claim 1, wherein the conductive coating layer includes at least one of nickel, cobalt, and iron.

3. The stealth antenna according to claim 1, wherein the dielectric fabric of the upper dielectric layer or the dielectric fabric of the lower dielectric layer includes a glass fiber or an aramid fiber.

4. The stealth antenna according to claim 1, wherein the spacer includes a plurality of partition walls extending in a vertical direction.

5. The stealth antenna according to claim 4, wherein the antenna patch is embedded in the lower dielectric layer so that an upper surface of the antenna patch and an upper surface of the lower dielectric layer are coplanar.

6. The stealth antenna according to claim 1, wherein the absorbing band of the electromagnetic wave absorbing structure includes at least one of C-band, X-band and Ku-band.

* * * * *